United States Patent
Klocman

(10) Patent No.: US 10,811,876 B2
(45) Date of Patent: Oct. 20, 2020

(54) DISCONNECT SWITCH STATUS IN A POWER DISTRIBUTION SYSTEM

(71) Applicant: FLORIDA POWER & LIGHT COMPANY, Juno Beach, FL (US)

(72) Inventor: Justin D. Klocman, Boca Raton, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 344 days.

(21) Appl. No.: 15/581,326

(22) Filed: Apr. 28, 2017

(65) Prior Publication Data

US 2018/0316186 A1 Nov. 1, 2018

(51) Int. Cl.
| | |
|---|---|
| *H02J 3/00* | (2006.01) |
| *G05B 15/02* | (2006.01) |
| *H02H 7/26* | (2006.01) |
| *H02J 13/00* | (2006.01) |

(52) U.S. Cl.
CPC ............... *H02J 3/00* (2013.01); *G05B 15/02* (2013.01); *H02H 7/261* (2013.01); *H02H 7/263* (2013.01); *H02J 3/001* (2020.01); *H02J 13/00001* (2020.01)

(58) Field of Classification Search
CPC ...... H02J 3/00; H02J 13/001; H02J 2003/001; G05B 15/02; H01H 71/04; H02H 7/261; H02H 7/263
USPC .......................................................... 702/60
See application file for complete search history.

(56) References Cited

U.S. PATENT DOCUMENTS

| | | | |
|---|---|---|---|
| 3,524,133 A | 8/1970 | Arndt | |
| 4,045,714 A | 8/1977 | MacLeod | |
| 4,075,699 A | 2/1978 | Schneider et al. | |
| 4,262,209 A * | 4/1981 | Berner | H02J 3/48 290/7 |
| 4,370,562 A | 1/1983 | Palazzetti et al. | |
| 4,370,609 A | 1/1983 | Wilson et al. | |
| 5,963,457 A | 10/1999 | Kanoi et al. | |
| 6,453,248 B1 | 9/2002 | Hart et al. | |
| 6,963,197 B1 * | 11/2005 | Feight | G01R 19/16509 324/117 R |
| 7,795,877 B2 * | 9/2010 | Radtke | G01R 19/16547 324/530 |

(Continued)

FOREIGN PATENT DOCUMENTS

| | | |
|---|---|---|
| CN | 203786159 U * | 8/2014 |
| WO | 9312436 | 6/1993 |

OTHER PUBLICATIONS

M. Lehtonen and et al, "Automatic fault management in distribution networks", CIRED2001, Jun. 18-21, 2001, Conference Publication No. 482 0 IEE 2001 (Year: 2001).*

(Continued)

*Primary Examiner* — Alexander Satanovsky
*Assistant Examiner* — Douglas Kay
(74) *Attorney, Agent, or Firm* — Tarolli, Sundheim, Covell & Tummino LLP

(57) ABSTRACT

An energy management system receives voltage and current data from each of a plurality of fault indicators. Each fault indicator is positioned on a powerline of a power distribution system immediately upstream of a respective one of a plurality of disconnect switches. The energy management system also determines a status of each disconnect switch based on the voltage and current from the plurality of fault indicators.

17 Claims, 4 Drawing Sheets

(56) References Cited

U.S. PATENT DOCUMENTS

| | | | |
|---|---|---|---|
| 8,594,956 B2 | 11/2013 | Banting et al. | |
| 9,020,650 B2 | 4/2015 | Lütze et al. | |
| 2004/0263183 A1* | 12/2004 | Naidu | G01R 31/025 |
| | | | 324/536 |
| 2005/0156234 A1 | 7/2005 | Gammel et al. | |
| 2006/0007619 A1* | 1/2006 | Scott | H02H 3/382 |
| | | | 361/93.1 |
| 2008/0003703 A1 | 1/2008 | Gammel et al. | |
| 2009/0083019 A1* | 3/2009 | Nasle | G06F 17/509 |
| | | | 703/18 |
| 2010/0052050 A1 | 3/2010 | Lotfi et al. | |
| 2010/0142447 A1* | 6/2010 | Schlicht | H04W 4/20 |
| | | | 370/328 |
| 2013/0120090 A1* | 5/2013 | Ball | H01H 83/04 |
| | | | 335/1 |
| 2014/0034613 A1* | 2/2014 | West | H01H 33/14 |
| | | | 218/4 |
| 2014/0064162 A1* | 3/2014 | Swartzendruber | |
| | | | H04W 52/0261 |
| | | | 370/311 |
| 2014/0172327 A1* | 6/2014 | Zhou | G01R 31/027 |
| | | | 702/58 |
| 2015/0295453 A1* | 10/2015 | Khoshnood | H02J 9/06 |
| | | | 307/23 |
| 2016/0359333 A1 | 12/2016 | Chen et al. | |
| 2017/0025892 A1* | 1/2017 | Van Ostrand | G01R 19/2513 |
| 2017/0358914 A1* | 12/2017 | Chaiquin | H02H 3/063 |
| 2019/0028023 A1* | 1/2019 | Eckhardt | H02M 1/4208 |

OTHER PUBLICATIONS

P. M. Sonwane and et al, "Distribution System Reliability Through Reconfiguration, Fault Location, Isolation and Restoration", International Conference on Control, Automation, Communication and Energy Conservation—2009, Jun. 4-6, 2009 (Year: 2009).*

S. Park and et al, A Fault Detection and Service Restoration Method by Shifting the Feeder Tie Switch for Ungrounded Distribution System, 2008 International Conference on Condition Monitoring and Diagnosis, Beijing, China, Apr. 21-24, 2008 (Year: 2008).* le;2qCooper Power Series; "Faulted Circuit Indicator Application Guide"; found on the Internet at http://www.cooperindustries.com/content/dam/public/powersystems/resources/library/320_FaultIndicators/CA320001EN.pdf; Feb. 2015.

* cited by examiner

DISCONNECT SWITCH STATUS IN A POWER DISTRIBUTION SYSTEM

TECHNICAL FIELD

This disclosure relates to systems and methods for determining a status of disconnect switches in a power distribution system.

BACKGROUND

In electrical engineering, a disconnect switch, which also may be referred to as a disconnector or isolator switch is used to ensure that an electrical circuit is completely de-energized for service or maintenance. Disconnect switches are used in electrical substations and transmission lines to allow isolation of electrical components such as circuit breakers, transformers, distribution feeder sectionalizing points, and transmission lines, for maintenance. The disconnect switch is usually not intended for normal control of the circuit, but only for safety isolation. Disconnect switches can be operated manually (e.g., by a maintenance crew technician, electrical lineman, etc.) or mechanically via linkages in ganged operation.

Unlike load switches and circuit breakers, disconnect switches lack a mechanism for suppression of electric arcs, which occurs when conductors carrying currents are electrically interrupted. Thus, disconnect switches are offline, off-load devices, intended to be opened after current has been interrupted by some other control device.

A fault indicator is a device that provides a visual or remote indication of a fault on the electric power system. Also called a faulted circuit indicator or a fault current indicator (FCI), the device is used in electric power distribution networks to automatically detect and identify faults to reduce outage time.

SUMMARY

One example relates to a server that includes a non-transitory machine readable medium having machine readable instructions and one or more processors that access the memory and execute the machine readable instructions. The machine readable instructions can include an energy management system (EMS) that receives voltage and current data from each of a plurality of fault indicators. Each fault indicator is positioned on a powerline of a power distribution system immediately upstream of a respective one of a plurality of disconnect switches. The energy management system determines a status of each disconnect switch based on the voltage and current data from the plurality of fault indicators.

Another example relates to a system that includes a plurality of fault indicators. Each fault indicator is positioned on a feeder of a power distribution system immediately upstream from a respective one of a plurality of disconnect switches. Each of the plurality of fault indicators provides data on a utility network characterizing a detected voltage and a detected current. The system also includes a utility server coupled to the utility network. The utility server also includes an energy management system that determines a status of each of the plurality of disconnect switches based on the data from each of the plurality of fault indicators. The utility server also includes a graphical user interface (GUI) that outputs a visual representation of the power grid, wherein the visual representation includes visual indicia indicating the determined status of each of the plurality of disconnect switches.

Yet another example relates to a method that includes receiving data characterizing a detected voltage and a detected current at each of a plurality of fault indicators installed on powerlines of a power distribution system. The method also includes determining a status for each of a plurality of disconnect switches installed on the powerlines of the power distribution system based on the received data, wherein the status is one of open, closed and a fault.

DETAILED DESCRIPTION

Figure 1:
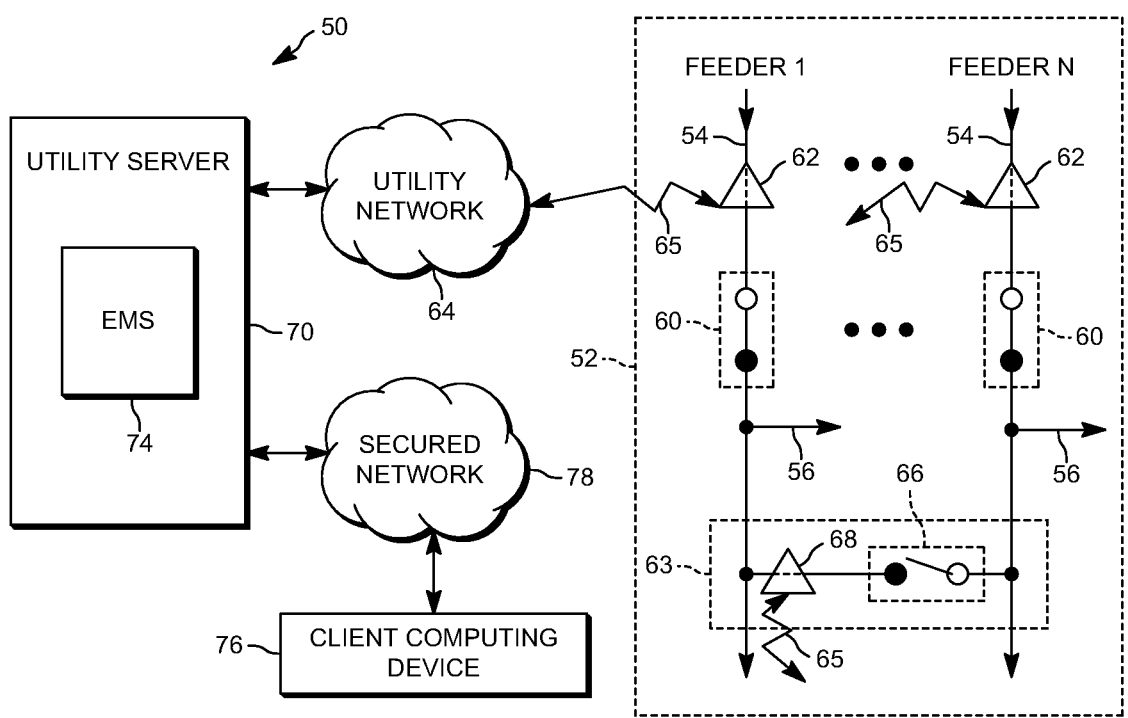
FIG. 1 illustrates an example of a system that determines a status of disconnect switches in a segment of a power distribution system.

This disclosure relates to systems and methods that can detect the status of disconnect switches in a power distribution system (a power grid). In particular, the system receives data (e.g., operational data) from a plurality of fault indicators. Each fault indicator is positioned on a feeder or lateral power line immediately upstream of a disconnect switch. Each fault indicator can provide data characterizing a detected voltage and current to the system via a network (e.g., a mesh network), which data may be referred to as voltage and current data. The system can analyze the data characterizing the voltage and current received from a particular fault indicator to determine an operational status of the downstream disconnect switch. In particular, the system can determine if the downstream disconnect switch is open, closed or if there is a fault on the power line.

For instance, if a given fault indicator provides data indicating that the power line has a voltage and current that meet acceptable voltage and current threshold levels, the system can determine that the downstream disconnect switch is "closed". Additionally, if the given fault indicator provides data indicating that the feeder power line has an voltage above the acceptable voltage threshold, but the current is below the acceptable current threshold, the system can determine that the downstream disconnect switch is "open". Furthermore, if the given fault detector provides data indicating that the feeder power line has both voltage and current that fall below the acceptable voltage and current thresholds and/or if no data is received (e.g., a timeout), the system can determine that a fault upstream of the given fault indicator has occurred.

The disconnect switches described in the present disclosure are "passive" disconnect switches that require no external power and provide no feedback to other systems. Moreover, the disconnect switches do not need overload protection (e.g., a circuit breaker or a fuse). Rather, the disconnect switches simply connect or disconnect two nodes on a powerlines via a removable conductive strip (e.g., a strip of metal). Accordingly, the fault indicators can be installed (retrofit) on the power distribution system, and the operations of the power distribution system are unaffected.

The system can aggregate the voltage and current data received from each fault indicator on the power distribution system. Additionally, the system can include an energy management system (EMS) that displays a status (open, closed or fault) of sections of the power distribution system in a graphical user interface (GUI).

By employment of the system described in the present disclosure, user error due to inaccurately reported disconnect switch status changes can be reduced and/or eliminated. Additionally, the fault indicators can be retrofit on existing feeder powerlines without further modification. In particular, there is no need to change/upgrade the disconnect switches to switches that actively report their status. Rather, the current and voltage data from a fault indicator that is immediately upstream of a (passive) disconnect switch can be employed to deduce the status of the disconnect switch.

FIG. 1 illustrates an example of a system 50 that determine a status of disconnect switches in a segment of a power distribution system 52. The electric power distribution system 52 can distribute power generated by a power generation source (e.g., a power plant, not shown) that generates electric power.

The power distribution system 52 can include N number of feeders 54 that can distribute electric power signals, where N is an integer greater than one. Each of the N number of feeders 54 can receive power from a substation coupled (via a transmission line) to the power generation source. Each feeder 54 can be formed as a powerline (e.g., an electric power transmission line). Moreover, each of the N number of feeders 54 can include a lateral 56 (or multiple laterals) that is coupled to a distribution transformer, which in turn, may be coupled to consumer premises (e.g., premises that consume electrical power).

Each feeder 54 includes a plurality of disconnect switches 60. Each disconnect switch 60 can be implemented as a manual (human actuated), mechanical switch that, when closed, couples two nodes of a powerline together and when opened, de-couples the two nodes. Each disconnect switch 60 is a passive electrical device that does not require external power for operation. Rather, each disconnect switch 60 includes a conductor (e.g., a strip of metal) that conducts electricity between the two nodes if the disconnect switch is closed.

A fault indicator 62 is electrically coupled to each feeder 54 at a position immediately upstream from a corresponding disconnect switch 60. In some examples, the fault indicator 62 may also be referred to as a fault current indicator (FCI). Thus, from the perspective of a given fault indicator 62, the corresponding disconnect switch 60 is immediately downstream from the given fault indicator 62. As used herein, the terms "immediately upstream" and "immediately downstream" indicate that no intervening electrical device is positioned between a fault indicator 62 and a corresponding (respective) disconnect switch 60.

Each disconnect switch 60 and each fault indicator 62 can be identified by a feeder number and a unique alpha numeric value. For example, a second disconnect switch 60 on a first feeder 54 can be referenced as $SW_{1,2}$. Similarly, the fault indicator 62 associated with the this disconnect switch 60 ($SW_{1,2}$) can be referenced as $FCI_{1,2}$ (Fault Current Indicator).

Each fault indicator 62 can be an electrical device coupled to the feeder 54 via mutual inductance. In this manner, each fault indicator 62 can be retrofit on a feeder 54 subsequent to installation (and operation of) the power distribution system 52. Each fault indicator 62 can be assigned an address on a utility network 64. The utility network 64 can be a mesh network, such as an Internet Protocol version 6 (IPv6) network. Moreover, a given fault indicator 62 can sense a voltage and a current on a feeder 54 at a position of installation of the given fault indicator 62. Additionally, the given fault indicator 62 can provide data on the utility network 64 that characterizes the detected voltage and current. Moreover, as explained herein, since each fault indicator 62 is immediately upstream of a corresponding disconnect switch 60, the data characterizing the detected voltage and current can be employed to determine (deduce) a status of the corresponding disconnect switch 60 (e.g., open, closed or fault, as explained herein).

In FIG. 1, wireless communication between the utility network 64 and each fault indicator 62 is represented as a line 65. For purposes of legibility, only one line 65 is shown as being coupled to the utility network 64. However, it is to be understood that each fault indicator 62 can communicate (directly or indirectly) with other nodes on the utility network 64 in a similar manner.

Each of the feeders 54 can be coupled to another feeder 54 via a feeder tie (FT) 65, which may alternatively be referred to as a feeder interconnect. The feeder tie 63 can be implemented as a conductive cable (e.g., a power line) coupled between nodes of the feeders 54. Each feeder tie 63 includes a disconnect switch 66. Additionally, in some examples, the feeder tie 63 includes a fault indicator 68. The disconnect switch 66 on the feeder tie 63 may be closed (manually by an electrical technician/lineman) in situations where a fault occurs on one of the two feeders 54 interconnected by the feeder tie 63 to isolate the feeder 54 experiencing the fault such that power can be restored to the feeder 54 experiencing the fault.

A utility server 70 can also be coupled to the utility network 64. The utility server 70 can be representative of a plurality of servers (e.g., a server farm) executing application software implemented to facilitate operations of a utility provider (e.g., a power company). The plurality of servers represented by the utility server 70 could be local computer devices (e.g., server blades) operating at a single premises and/or distributed across multiple facilities, such as in a computing cloud.

The utility server 70 can include an energy management system (EMS) 74 that receives the data characterizing the detected voltage and current from each of the fault indicators 62. The energy management system 74 can employ the data characterizing the detected voltage and current to populate a status table that maps each fault indicator 62 with a corresponding disconnect switch 60. Additionally, based on the data characterizing the detected voltage and current at a given fault indicator 62, the energy management system 74 can determine a status for each corresponding disconnect switch 60.

In particular, in a first situation, a given fault indicator 62 provides data indicating that a detected electrical voltage (relative to a ground plane) on a given feeder 54 is at or above a threshold voltage level (e.g., about 1 to 40 kilovolts (kV)). Additionally, in the first situation, the data provided by the given fault indicator 62 indicates that the detected electrical current on the given feeder 54 is at or above a threshold current level (e.g., about 1 ampere (A)). Accordingly, in the first situation, the energy management system 74 can determine that a given disconnect switch 60 immediately downstream from the given fault indicator 62 is closed.

Additionally, in a second situation, the given fault indicator 62 provides data indicating that a detected electrical voltage on the given feeder 54 is at or above the threshold voltage level (e.g., about 1 to 40 kilovolts (kV)). In the second situation, the data provided by the given fault indicator 62 indicates that the detected electrical current on the feeder 54 is below the threshold current level (e.g., at about 0 ampere (A)). Accordingly, in the second situation, the energy management system 74 can determine that the given disconnect switch 60 immediately downstream from the given fault indicator 62 is open.

Further, in a third situation, the given fault indicator 62 provides data indicating that a detected electrical voltage (relative to a ground plane) on a feeder 54 is below the threshold voltage level (e.g., about 1 to 40 kilovolts (kV)). Alternatively, in the third situation, the given fault indicator 62 may not provide an update within a predetermined amount of time (e.g., a timeout). In the third situation, the data provided (or not provided) by the given fault indicator 62 indicates that the detected electrical current on the feeder 54 is at or below the threshold current level (e.g., at about 0 ampere (A)). Accordingly, in the third situation, the energy management system 74 can determine that a fault has occurred upstream of the given fault indicator 62 or a disconnect switch 62 upstream has been opened, thereby preventing voltage and current from flowing through the given feeder 54 at a position of the given fault indicator 62.

In a similar manner, the energy management system 74 can determine the status for each of the disconnect switches 60 and/or the disconnect switch 66 of the feeder tie 63. The determined status can be stored in the status table. The status table populated with the determined status of each disconnect switch 60 can be stored in data accessible by the energy management system 74 of the utility server 70, such as in local or network data storage.

The energy management system 74 can employ the status of each of the disconnect switches 60 and/or the disconnect switch 66 to generate/update an output of a graphical user interface (GUI). The GUI could output, for example, a map with visual indicia (e.g., icons and/or text) that represent a location and status of each of the plurality of disconnect switches 60 and 66. The GUI can also output information derived from other sources (e.g., information related to service tickets for dispatch of repair crews).

In some examples, the output of the GUI can be displayed locally (e.g., on a monitor connected to the utility server 70). In other examples, the output of the GUI can be provided on a remote system (e.g. on a client computing device 76) that communicates with the energy management system 74 via a secure (closed) network 78 In some examples, data in the secure network 78 may be transmitted via a secure channel through a public network (e.g., the Internet). Accordingly, in some examples, the secure network 78 (or some portion thereof), can be implemented as a virtual private network (VPN). The client computing device 76 can be a user terminal, a workstation or a mobile device.

By employment of the system 50, the status (e.g., open, closed or fault) of each of the disconnect switches 60 and/or the disconnect switch 66 can be determined. Accordingly, a relatively error prone process of visually inspecting each disconnect switch 60 and 66 and reporting their status can be avoided. Moreover, as noted, the disconnect switches 60 and 66 are passive devices that operate as manual mechanical switches. Accordingly, the system 50 can be retrofit on an existing power distribution system 52 without modifications to the structural features, such as the powerlines and/or the disconnect switches 60 and/or the disconnect switch 66.

Figure 2:
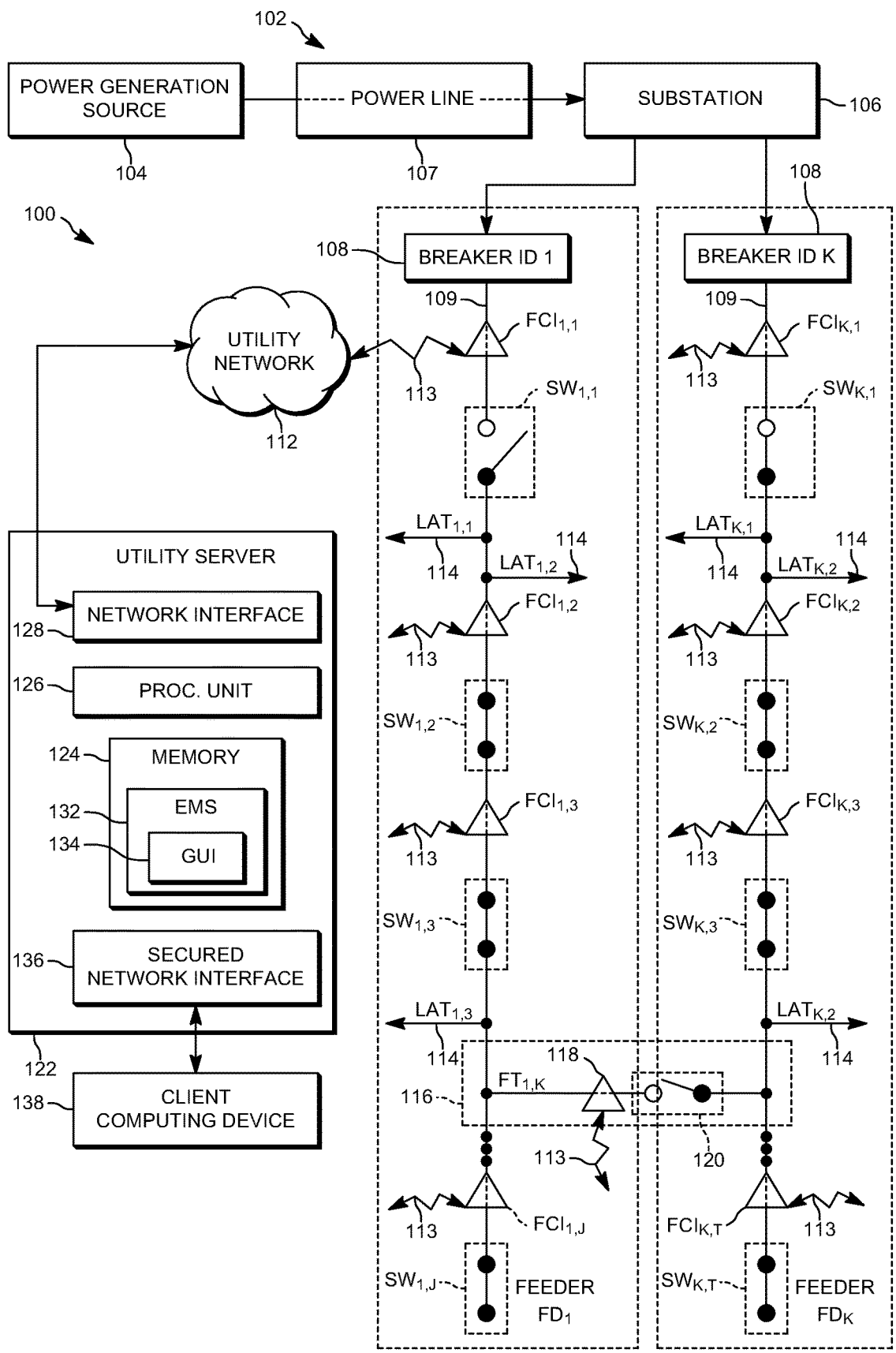
FIG. 2 illustrates another example of a system that determines a status of disconnect switches in a segment of a power distribution system.

FIG. 2 illustrates another example of a system 100 that determines a status of disconnect switches in an electric power distribution system 102. The electric power distribution system 100 can include a power generation source 104 that can generate electric power. The power generation source 104 could be representative of a power plant, such as a fossil fuel or coal-fired plant, a nuclear plant, a wind farm and/or a solar array and attendant constituent structures or any combination thereof. The power generation source 104 can transmit a high-voltage, alternating current (AC) power signal (such as a 115 or 220 kV AC power signal) to a substation 106 (a power distribution substation) via a power line 107 (e.g., a transmission line).

The substation 106 can transform the high voltage AC power signal into a mid-voltage power signal. For example, it may be desirable in some circumstances to step down (or to step up) voltage via one or more substations 106, to phase-shift and/or otherwise to adjust current phase or amplitude of an electrical signal. As one example, the substation 106 may include electrical components (transformers) for transforming and conditioning a 138 kV AC signal into a 69, 13.2 or 23 kV AC signal. In another example, the substation 106 may include electrical components for transforming and conditioning a 230 kV AC signal into a 69, 13.2 or 23 kV AC signal. It is to be appreciated that in yet other examples, different input and output voltages could be implemented. It is noted that the electric power distribution system 102 may include more than one power generation source 104 and/or more than one substation 106. The substation 106 can distribute electric power signals to K number of feeders (labeled as $FD_1 \ldots FD_K$), where N is an integer greater than one.

For purposes of simplification of explanation, in FIG. 2, there are two feeders, a first feeder, $FD_1$ and the Kth feeder, $FD_K$, but in other examples, hundreds or thousands of feeders could be employed in the segment of the power grid. Each of the K number of feeders can include a power line 109 that may be implemented as a mid-voltage power (e.g., 13 kV) line that transfers power from a distribution substation to distribution transformers.

The feeder $FD_1$ includes a breaker 108 that can be referenced with a unique identifier (ID). The breaker 108 of the first feeder is provided input power from the substation 106. The feeder $FD_K$ also includes a breaker 108 that can also be referenced with a unique ID. In the example illustrated, the breaker 108 of the $FD_K$ is coupled to the same substation 106. However, in other examples, the breaker 108 of the feeder $FD_K$ may be coupled to a different substation.

The breaker 108 of the feeder $FD_1$ is conductively coupled to J number of downstream disconnect switches $SW_{1,1} \ldots SW_{1,J}$, wherein the subscript indicates a feeder number and an order of the switch relative to the breaker 108, and J is an integer greater than or equal to one. Thus, the first disconnect switch of feeder $FD_1$ is labeled as disconnect switch $SW_{1,1}$. Similarly, the breaker 108 of the feeder $FD_K$ is conductively coupled to T number of downstream disconnect switches $SW_{K,1} \ldots SW_{K,T}$ wherein the subscript indicates a feeder number and an order of the switch relative to the breaker 108 and T is an integer greater than or equal to one.

Immediately upstream of each of the J number of switches ($SW_{1,1} \ldots SW_{1,J}$) of the feeder $FD_1$, a corresponding fault indicator is installed. That is, the feeder $FD_1$ includes J number of fault indicators, $FCI_{1,1} \ldots FCI_{1,J}$. Similarly, the feeder $FD_K$ immediately upstream each of the T number of disconnect switches ($SW_{K,1} \ldots SW_{K,T}$) include T number of fault indicators, $FCI_{K,1} \ldots FCI_{K,T}$. The subscript of each fault indicator matches a subscript of an immediately downstream disconnect switch. For instant, the fault indicator $FCI_{1,1}$ is immediately upstream (and is associated with) the disconnect switch $SW_{1,1}$.

Each fault indicator $FCI_{1,1} \ldots FCI_{1,J}$ and $FCI_{K,1} \ldots FCI_{K,T}$ can include a wireless or wired network interface card, such as Internet Protocol Version 6 (IPv6) network card to communicate on a utility network 112. In this situation, each fault indicator $FCI_{1,1} \ldots FCI_{1,J}$ and $FCI_1 \ldots FCI_T$ can be assigned a network address on the utility network 112. Each fault indicator, $FCI_{1,1} \ldots FCI_{1,J}$ and $FCI_{K,1} \ldots FCI_{K,T}$ may be implemented as an electronic device that outputs data to the utility network 112 indicating the presence of a fault on the electric power distribution system 102. Each fault indicator $FCI_{1,1} \ldots FCI_{1,J}$ and $FCI_{K,1} \ldots FCI_{K,T}$ is configured to sense a magnetic field caused by current flowing through the powerline 109 on the feeder, $FD_1 \ldots FD_K$ to determine a current flowing through the powerline 109. Additionally, each fault indicator $FCI_{1,1} \ldots FCI_{1,J}$ and $FCI_{K,1} \ldots FCI_{K,T}$ can measure an electric field induced by voltage in the powerline 109 to determine/calculate a voltage on the powerline 109 relative to a ground plane. Accordingly, a given fault indicator $FCI_{1,1} \ldots FCI_{1,J}$ and $FCI_{K,1} \ldots FCI_{K,T}$ can provide (publish) data to the utility network 112 characterizing a voltage and current detected on the powerline 109 corresponding to an installation position of the given fault indicator.

In FIG. 2, wireless communication between the utility network 112 and each fault indicator $FCI_{1,1} \ldots FCI_{1,J}$ and $FCI_{K,1} \ldots FCI_{K,T}$ is represented as lines 113. For purposes of legibility, only one line 113 is shown as being coupled to the utility network 112. However, it is to be understood that each fault indicator $FCI_{1,1} \ldots FCI_{1,J}$ and $FCI_{K,1} \ldots FCI_{K,T}$ can communicate (directly or indirectly) with other nodes on the utility network 64 in a similar manner.

Each feeder, $FD_1 \ldots FD_K$ can include a plurality of lateral power lines, referred to as laterals 114. In the example illustrated, the feeder, $FD_1$ includes three (3) laterals, $LAT_{1,1} \ldots LAT_{1,3}$ and the feeder $FD_K$ includes two (2) laterals $LAT_{K,1}$ and $LAT_{K,2}$. Each lateral 114 is coupled to a distribution transformer (not shown) that can, in turn provide power to another distribution transformer and/or a customer premises (e.g., an electrical consumer).

The feeders $FD_1$ and $FD_K$ are interconnected via a feeder tie 116 (which can also be referred to as a feeder interconnect). The feeder tie 116 is also labeled as reference $FT_{1,K}$, wherein the subscript (1,K) identifies the feeders $FD_1$ and $FD_K$ that are connectable via the feeder tie 116. In other examples, the feeders $FD_1$ and $FD_K$ could be interconnected to additional/other feeders (e.g., feeders $FD_2 \ldots FD_{K-1}$) of the electric power distribution system 102. The feeder tie 116 includes a disconnect switch 120 and a fault indicator 118. The fault indicator 118 may also be assigned an address on the utility network 112.

Figure 3:
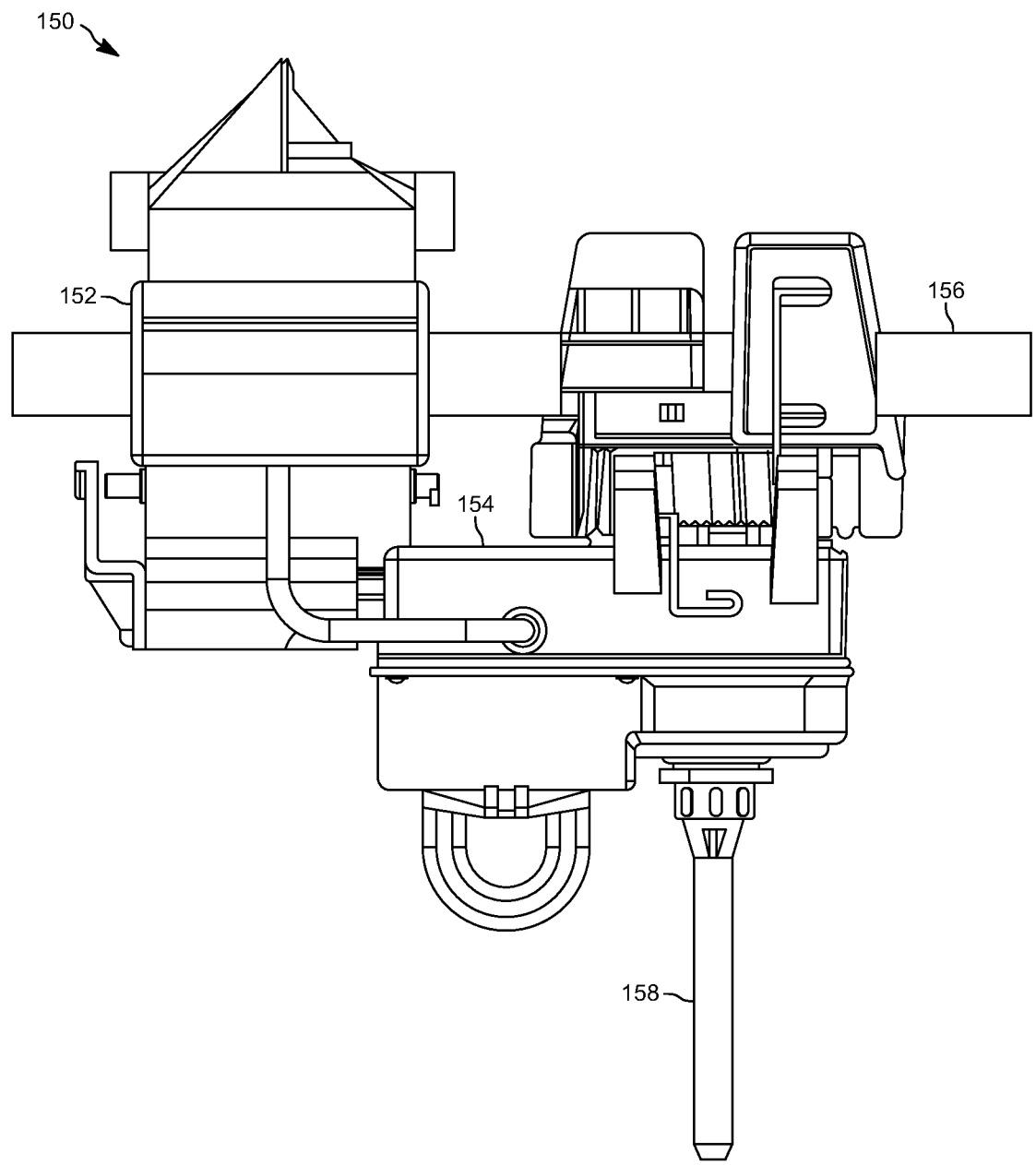
FIG. 3 illustrates a diagram of an example a fault indicator.

FIG. 3 illustrates an example of a fault indicator 150 that could be employed, for example, to implement one or more of the fault indicators $FCI_{1,1} \ldots FCI_{1,J}, FCI_{K,1} \ldots FCI_{K,T}$ and/or the fault indicator 118 of the feeder tie 116. The fault indicator 150 can include a current transformer 152 coupled to a housing 154. The current transformer 152 clamps onto a powerline 156. In this manner, current flowing through the powerline 156, via mutual inductance on the current transformer 152 powers circuitry in the fault indicator 150. Additionally, in some examples, the fault indicator 150 can have an internal power supply (e.g., a battery) that allows the fault indicator to continue to operate in situations where no current is flowing on the powerline 156.

Additionally, the fault indicator 150 includes an antenna 158 that allows for wireless bi-directional (or one-way) communication on a utility network, such as the utility network 112 of FIG. 2. The fault indicator 150 can include internal circuitry (e.g., a microcontroller and/or digital logic) configured to sense a substantially real-time (e.g., within about 5 seconds) current and voltage (relative to a ground plane) on the powerline 156 at a position of the current transformer 152. Moreover, the fault indicator 150 (via the antenna 158) can periodically and/or asynchronously (such as in response to a request or in response to detecting a state change in voltage and/or current on the powerline 156) provide data characterizing the substantially real-time sensed current and voltage to the utility network for analysis, as described herein.

The fault indicators 150 can be installed (clamped) onto the powerline 156 without change to a power grid that includes the powerline 156. In this manner, the fault indicator 150 enhances operations of the power grid without requiring substantial changes to the structure of the power grid.

Referring back to FIG. 2, the utility network 112 could be implemented for example, as a secure network, a private network (e.g., a VPN) or a combination thereof. The utility network 112 can be implemented as a mesh network, such as an IPv6 network. A utility server 122 is also coupled to the utility network 112.

The utility server 122 can be representative of a plurality of servers (e.g., a server farm) executing application software implemented to facilitate operations of a utility provider (e.g., a power company). The plurality of servers represented by the utility server 122 could be local computer devices (e.g., server blades) operating at a single premises (facility operated by an electric power provider) and/or distributed across multiple facilities, such as in a computing cloud. The utility server 122 can include a memory 124 that can store machine readable instructions. The memory 124 could be implemented, for example, as non-transitory computer readable media, such as volatile memory (e.g., random access memory), nonvolatile memory (e.g., a hard disk drive, a solid state drive, flash memory, etc.) or a combination thereof. The utility server 122 can also include a processing unit 126 to access the memory 124 and execute the machine-readable instructions. The processing unit 126 can include, for example, one or more processor cores. The utility server 122 can include a network interface 128 configured to communicate with nodes on the utility network 112. The network interface 128 could be implemented, for example, as a network interface card.

As noted, the utility server 122 (or a portion thereof) can be implemented in a remote computing system, such as a computing cloud. In such a situation, features of the utility server 122, such as the processing unit 126, the network interface 128, and the memory 124 could be representative of a single instance of hardware or multiple instances of hardware with applications executing across the multiple of instances (i.e., distributed) of hardware (e.g., computers, routers, memory, processors, or a combination thereof). Alternatively, the utility server 122 could be implemented on a single dedicated computing device.

The memory 124 can include an energy management system (EMS) 132 that aggregates and analyzes data provided from the fault indicators $FCI_{1,1} \ldots FCI_{1,J}$ and $FCI_{K,1} \ldots FCI_{K,T}$ the feeders $FD_1 \ldots FD_K$ and the fault indicator 118 on the feeder tie 116. Upon analyzing the data, the energy management system 132 can determine a status of each disconnect switch $SW_{1,1} \ldots SW_{1,J}$ and $SW_{K,1} \ldots$ $SW_{K,T}$ on feeders $FD_1 \ldots FD_K$ and the feeder disconnect switch 118 on the feeder tie 116. The energy management system 132 can maintain a status table (or other data structure) that maps each fault indicator to a corresponding (immediately downstream) disconnect switch. The mapping can be based, for example, on an assigned network address of each fault indicator.

As an extended example, hereinafter, "the given example", it is presumed that the disconnect switch $SW_{1,1}$ and the disconnect switch 120 of the feeder tie 116 are open and the remaining switches $SW_{1,2} \ldots SW_{1,J}$ and $SW_{K,1} \ldots SW_{K,T}$ are closed. In such a situation, the fault indicator $FCI_{1,1}$ may provide data indicating that a high voltage (e.g., about 1 to 40 kV) signal that meets a threshold voltage is detected and a current of about 0 Amperes (A) that is below a threshold current is detected. Based on the installation position of the fault indicator $FCI_{1,1}$, the energy management system 132 can deduce that the disconnect switch immediately downstream the fault indicator $FCI_{1,1}$, namely disconnect switch, $SW_{1,1}$ is open.

Continuing with the given example, the fault indicator $FCI_{1,2}$ may provide data (or timeout from a lack of power) indicating that a voltage of about 0 V is detected and a current of about 0 A is detected. Based on the installation position of the fault indicator $FCI_{1,2}$ the energy management system 132 can deduce that a disconnect switch upstream of the fault indicator $FCI_{1,2}$ is open, (disconnect switch $SW_{1,1}$, in the given example) and/or there exists a fault on (at least) each lateral downstream of the fault indicator $FCI_{1,2}$, including lateral $LAT_{1,3}$.

Further, in the given example, the fault indicator $FCI_{K,1}$ may provide data indicating that a high voltage (e.g., about 1 to 40 kV) meeting the threshold voltage and a current meeting the threshold current (e.g., at least about 1 A) is detected. Based on the installation position of the fault indicator $FCI_{K,1}$, the energy management system 132 can deduce that the disconnect switch immediately downstream the fault indicator $FCI_{K,1}$ is closed (disconnect switch $SW_{K,1}$).

Additionally, in the given example, the fault indicator $FCI_{K,T}$ may provide data indicating that a high voltage (e.g., about 1 to 40 kV) that meets the threshold voltage and the threshold current level (e.g., at least about 1 A) is detected. Similarly, the fault indicator 118 on the feeder tie 116 may provide data indicating that a voltage of about 0 V and a current of about 0 A are detected or the fault indicator 118 may timeout (not provide data). Based on the position of the fault indicator $FCI_{K,T}$ and the fault indicator 118 of the feeder tie 116, the energy management system 132 may deduce that the disconnect switch $SW_{K,T}$ is closed and the disconnect switch 120 of the feeder tie 116 is open. The status of each disconnect switch $SW_{1,1} \ldots SW_{1,J}$ and $SW_{K,1} \ldots SW_{K,T}$ and the disconnect switch 120 can be stored in the status table.

The energy management system 132 can provide (publish) data from the status table indicating a status of each disconnect switch $SW_{1,1} \ldots SW_{1,J}$ and $SW_{K,1} \ldots SW_{K,T}$ and the disconnect switch 120 of the feeder tie 116. The energy management system 132 can employ the status table to generate/update a GUI 134 that allows a visualization of the status of the feeders $FD_1 \ldots FD_K$. The visualized status can characterize a determined status (e.g., open, closed or fault) associated with each disconnect switch $SW_{1,1} \ldots SW_{1,J}$ and $SW_{K,1} \ldots SW_{K,T}$ and the disconnect switch 120 of the feeder tie. Although FIG. 2 illustrates the GUI 134 as being a component of the energy management system 132, in other examples, the GUI 134 may be implemented on a separate system or server.

Figure 4:
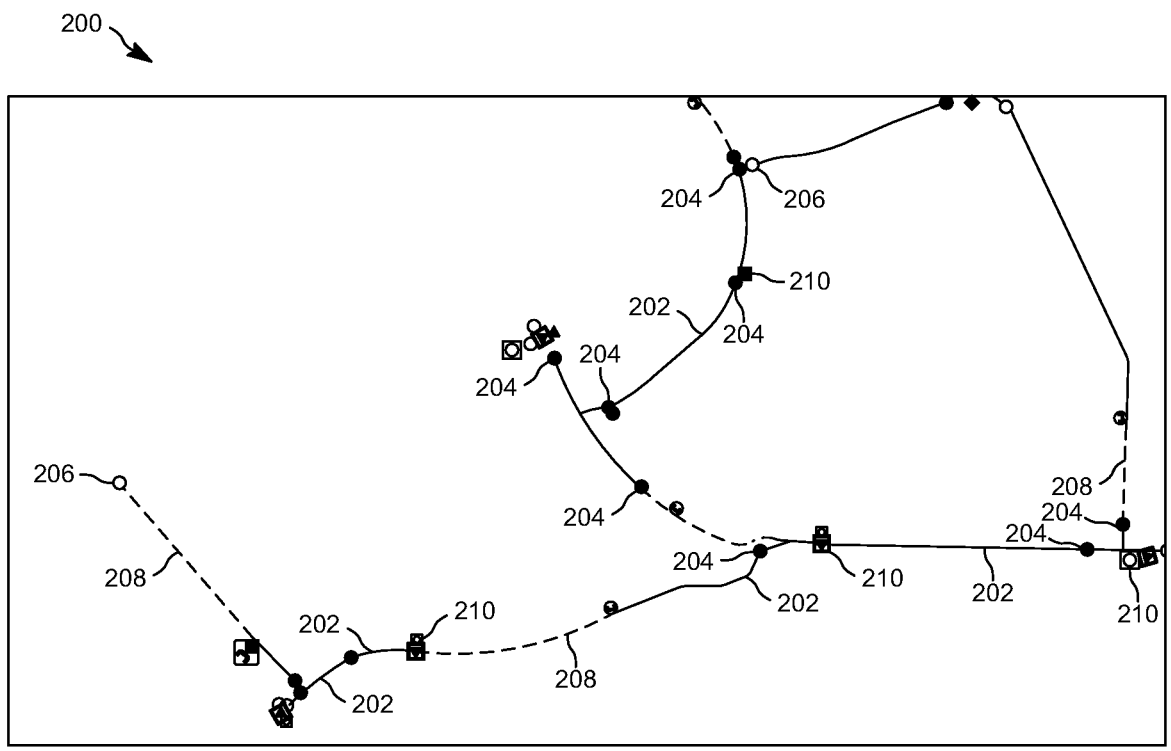
FIG. 4 illustrates an example of a screenshot output by an energy management system (EMS).

In some examples, the GUI 134 for the energy management system 132 can be output on a client application via a secured network interface 136. The client application could be executed on a client computing device 138, such as a user workstation or a mobile computing device. In some examples, the client application could be a propriety application, and in other examples, the client application could be a web browser. FIG. 4 illustrates an example of a screenshot 200 that could be output by the GUI 134 of the energy management system 132.

The screenshot 200 includes solid lines 202 representing a segment of a power grid that is providing power (e.g., live) to other segment of the power grid and/or a customer premises. Additionally, the screenshot 200 includes solid dots (icons and/or other visual indicia) 204 representing disconnect switches (e.g., such as the disconnect switch $SW_{1,1} \ldots SW_{1,J}$ and $SW_{K,1} \ldots SW_{K,T}$ and/or the disconnect switch 120 of FIG. 2) that are closed. Similarly, the screenshot 200 includes hollow dots (icons and/or other visual indicia) 206 that represent disconnect switches that are open. Furthermore, in the screenshot 200, a dashed line 208 represents a powerline that is underground. In some examples, the pattern (e.g., solid or dashed) of lines may be employed to indicate other things. Additionally, in some examples, line pattern (e.g., color) can identify a feeder that powers a particular powerline. Furthermore, the screenshot 200 includes icons 210 representing other actions, including a dispatch of a service crew, a caution area, etc.

In some examples, the GUI can allow actuation (e.g., in response to user input) of icons, such as the solid dots 204 and/or the hollow dots 206 to reveal (e.g., via text) a location of the disconnect switch represented by the icon. In this manner, a viewer of the screenshot 200 can ascertain whether a service crew needs to be dispatched to a particular area of a power grid. It is to be understood that the screenshot 200 is only one example layout, and in other examples, more or less indicia (icons and/or text) may be employed to convey a status of disconnect switches to a user.

Referring back to FIG. 2, continuing with the given example, the customer premises served by (at least) the laterals $LAT_{1,1}$, $LAT_{1,2}$ and $LAT_{1,3}$ is not provided power. Additionally, in the given example, it is presumed that a fault upstream of the fault indicator $FCI_{1,1}$ has occurred, which warranted opening the disconnect switch $SW_{1,1}$. Thus, to remedy this situation (while correcting the fault), the disconnect switch 120 on the feeder tie 116 can be (manually) closed, allowing current to flow from the feeder $FD_K$ into the feeder $FD_1$. In this situation, power can be restored to the laterals $LAT_{1,1}$, $LAT_{1,2}$ and $LAT_{1,3}$ while the fault is being corrected. In many examples, upon correcting the fault, the disconnect switch 120 on the feeder tie 116 is reopened, and the disconnect switch $SW_{1,1}$ is closed. In these situations, upon detecting a change in voltage and current and/or after a period of time (e.g., about 1 minute) the data provided to the utility network 112 by the fault indicators $FCI_{1,1} \ldots FCI_{1,J}$ may also be updated. Accordingly, the energy management system 132 can detect the update, and update the GUI 134.

By employing the system 100, error prone verbal and/or manual data entry reporting of a status of the disconnect switches $SW_{1,1} \ldots SW_{1,J}$ and/or $SW_{K,1} \ldots SW_{K,T}$ and/or the disconnect switch 120 after visual inspection can be avoided. In particular, the system 100 obviates the need for such a verbal and/or manual data entry reporting. Furthermore, as noted, the disconnect switches $SW_{1,1} \ldots SW_{1,J}$ and/or $SW_{K,1} \ldots SW_{K,T}$ and/or the disconnect switch 120 are passive devices (e.g., formed as a simple manual, mechanical switch). Additionally, the fault indicators $FCI_{1,1} \ldots FCI_{1,J}$ and $FCI_{K,1} \ldots FCI_{K,T}$ can be installed without modification to the structure of the electric power distribution system 102. That is, as explained with respect to FIG. 3, the fault indicators $FCI_{1,1} \ldots FCI_{1,J}$ and $FCI_{K,1} \ldots FCI_{K,T}$ are clamped around a powerline, and do not require any re-routing and/or disconnection of a power for installation.

Figure 5:
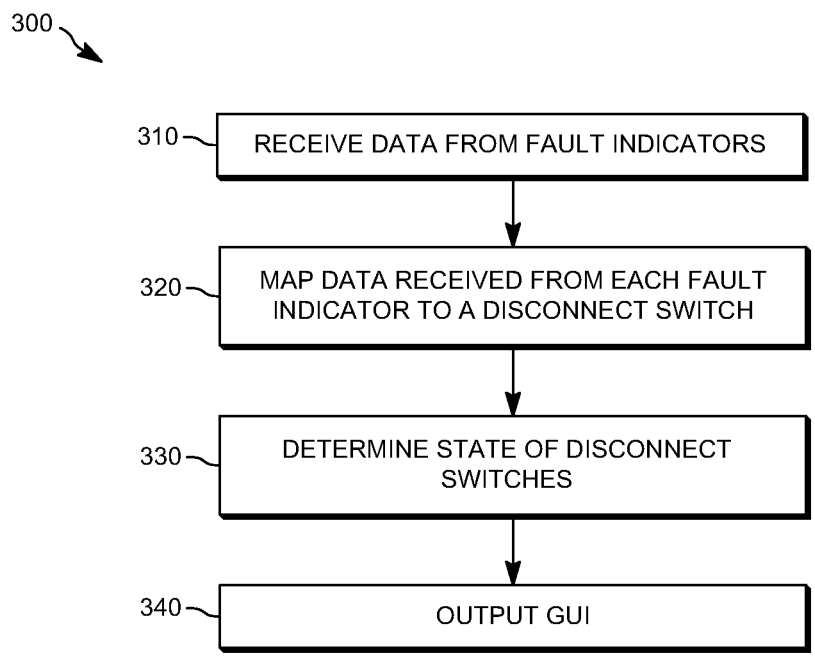
FIG. 5 illustrates a flowchart of an example method for determining a status of disconnect switches.

In view of the foregoing structural and functional features described above, example methods will be better appreciated with reference to FIG. 5. While, for purposes of simplicity of explanation, the example method of FIG. 5 is shown and described as executing serially, it is to be understood and appreciated that the present examples are not limited by the illustrated order, as some actions can in other examples occur in different orders, multiple times and/or concurrently from that shown and described herein. Moreover, it is not necessary that all described actions be performed to implement a method.

FIG. 5 illustrates a flowchart of an example method 300 for determining a status of disconnect switches installed on a power distribution system (e.g., a power grid). The method 300 can be implemented by a utility server, such as the utility server 70 of FIG. 1 and/or the utility server 122 of FIG. 2. At 310, data from fault indicators is received at the utility server via a utility network (e.g., the utility network 64 of FIG. 1 and/or the utility network 112 of FIG. 2).

At 320, the utility server can map data received from each fault indicator to a disconnect switch of the power distribution system. At 330, the utility server can determine a status of each of the disconnect switches (e.g., open, closed or fault). At 340, the utility server can output a GUI that includes a map with visual indicia (e.g., icons) that represent the determined status of each of the plurality of disconnect switches (or some subset thereof).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A server comprising:
   a non-transitory machine readable medium having machine readable instructions; and
   one or more processors that access the non-transitory machine readable medium and execute the machine readable instructions, the machine readable instructions comprising:
   an energy management system that receives voltage and current data from each of a plurality of fault indicators, wherein a power distribution system comprises a plurality of powerlines retrofitted with at least one of the plurality of fault indicators, wherein each fault indicator is positioned on and inductively coupled to a respective powerline of the plurality of powerlines of the power distribution system immediately upstream or downstream of a respective one of a plurality of disconnect switches at a feeder tie that couples two feeders of the power distribution system together, wherein each of the plurality of disconnect switches is coupled to two nodes of the respective powerline at the feeder tie, each fault indicator being configured to measure a current of the respective powerline via the inductive coupling, wherein each disconnect switch is a passive device, and the energy management system determines a status of each disconnect switch based on the received voltage and current data from a corresponding one of the plurality of fault indicators, wherein a determined status of each disconnect switch is one of open, closed, and a fault, wherein the fault status corresponding to a detected voltage and a detected current at a corresponding one of the plurality of fault indicators being below a respective threshold voltage level and threshold current level, wherein the energy management system provides a graphical user interface (GUI) that outputs a visual representation of the power grid, wherein the visual representation includes visual indicia characterizing the determined status of each of the plurality of disconnect switches.

2. The server of claim 1, wherein each disconnect switch is a manual mechanical switch.

3. The server of claim 2, wherein each fault indicator comprises a current transformer that is electrically coupled to a corresponding powerline of the power grid via mutual inductance.

4. The server of claim 1, further comprising a network interface that communicates with a utility network, and each of the plurality of fault indicators is assigned a network address on the utility network.

5. The server of claim 4, wherein the utility network is an Internet Protocol version 6 (IPv6) network.

6. The server of claim 4, wherein the utility network is a meshed communication system.

7. The server of claim 4, wherein each fault indicator comprises an antenna for wirelessly communicating on the utility network.

8. The server of claim 1, wherein the status of a given disconnect switch of the plurality of disconnect switches is determined to be open in response to a corresponding fault indicator providing data indicating that the detected voltage meets the threshold voltage level and that the detected current is below the threshold current level.

9. The server of claim 1, wherein the status of a given disconnect switch of the plurality of disconnect switches is determined to be closed in response to a corresponding fault indicator providing data indicating that the detected voltage meets the threshold voltage level and that the detected current meets the threshold current level.

10. The server of claim 1, wherein each fault indicator comprises:
   a current transformer configured to inductively couple a given fault indicators to the powerline immediately upstream of a given one of the plurality of disconnect switches, wherein the current transformer is further configured to provide current to the given fault indicator via mutual inductance;
   an internal power supply to provides power to the given fault indicator when no current is flowing on the powerline; and an antenna configured to wirelessly provide voltage and current data from the given fault indicator to the energy management system at a predetermined time and/or in response to detecting a change in the status of the given one of the plurality of disconnect switches.

11. A system comprising:
a power distribution system comprising a plurality of feeders is retrofitted with at least one of a plurality of fault indicators, wherein each fault indicator is positioned on and inductively coupled to a respective feeder of the plurality of feeders of the power distribution system immediately upstream or downstream from a respective one of a plurality of disconnect switches via the inductive coupling at a feeder tie that couples at least two of the plurality of feeds together, wherein each disconnect switch is a passive device, wherein each of the plurality of fault indicators provides data on a utility network characterizing a detected voltage and a detected current;
a utility server coupled to the utility network, the utility server comprising:
an energy management system that determines a status of each of the plurality of disconnect switches based on the data from each of the plurality of fault indicators, wherein the determined status for each of the plurality of disconnect switches is one of open, closed, and a fault, wherein the fault status corresponding to a detected voltage and a detected current at a corresponding one of the plurality of fault indicators being below a respective threshold voltage level and threshold current level; and
a graphical user interface (GUI) that outputs a visual representation of the power grid, wherein the visual representation includes visual indicia indicating the determined status of each of the plurality of disconnect switches.

12. The server of claim 11, wherein each fault indicator comprises an antenna for wirelessly communicating on the utility network.

13. The system of claim 11, wherein each fault indicator comprises:
a current transformer configured to inductively couple a given fault indicators to the powerline immediately upstream of a given one of the plurality of disconnect switches, wherein the current transformer is further configured to provide current to the given fault indicator via mutual inductance;
an internal power supply to provides power to the given fault indicator when no current is flowing on the powerline; and
an antenna configured to provide wirelessly voltage and current data from the given fault indicator to the energy management system at a predetermined time and/or in response to detecting a change in the status of the given one of the plurality of disconnect switches.

14. A method comprising:
receiving data characterizing a detected voltage and a detected current at each of a plurality of fault indicators installed on powerlines of a power distribution system, wherein the power distribution system is retrofitted with the plurality of fault indicators positioned on and inductively coupled to the powerlines of the power distribution system at a feeder tie that couples two feeders of the of the power distribution system together, wherein the detected voltage and the detected current at each of the plurality of fault indicators is measured via the inductive coupling;
determining a status for each of a plurality of disconnect switches installed on the powerlines of the power distribution system based on the received data, wherein each of the plurality of disconnect switches are passive devices installed via a coupling to two nodes of the powerline, wherein the status is one of open, closed and a fault, wherein the fault status corresponding to a detected voltage and a detected current at a corresponding one of the plurality of fault indicators being below a respective threshold voltage level and threshold current level; and
outputting a graphical representation of a portion of the power distribution system.

15. The method of claim 14, wherein each of the plurality of disconnect switches is a device comprising a manual, mechanical switch.

16. The method of claim 14, wherein the graphical representation of a portion of the power distribution system comprises visual indicia representing the status of each of the plurality of disconnect switches.

17. The method of claim 14, wherein each fault indicator comprises:
a current transformer configured to inductively couple a given fault indicators to the powerline immediately upstream of a given one of the plurality of disconnect switches, wherein the current transformer is further configured to provide current to the given fault indicator via mutual inductance;
an internal power supply to provides power to the given fault indicator when no current is flowing on the powerline; and
an antenna configured to wirelessly provide voltage and current data from the given fault indicator to the energy management system at a predetermined time and/or in response to detecting a change in the status of the given one of the plurality of disconnect switches.

* * * * *